United States Patent
Degner et al.

(10) Patent No.: US 10,432,056 B2
(45) Date of Patent: Oct. 1, 2019

(54) ELECTRIC MACHINE ROTOR ENDCAP

(71) Applicant: Ford Global Technologies, LLC, Dearborn, MI (US)

(72) Inventors: Michael W. Degner, Novi, MI (US); Edward Chan-Jiun Jih, Troy, MI (US); Tienli Wang, Troy, MI (US); Prasad Dev Hanumalagutti, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 15/138,368

(22) Filed: Apr. 26, 2016

(65) Prior Publication Data

US 2017/0310190 A1    Oct. 26, 2017

(51) Int. Cl.
*H02K 9/19* (2006.01)
*H02K 5/20* (2006.01)

(52) U.S. Cl.
CPC ............... *H02K 5/20* (2013.01); *H02K 9/19* (2013.01)

(58) Field of Classification Search
CPC .............. H02K 1/32; H02K 9/19; H02K 5/20
USPC ........................................ 310/52, 54, 58, 59
See application file for complete search history.

(56) References Cited

U.S. PATENT DOCUMENTS

| 5,347,188 | A | 9/1994 | Iseman et al. |
| 7,122,923 | B2 | 10/2006 | LaFontaine et al. |
| 8,766,497 | B2 | 7/2014 | Goto et al. |
| 2011/0273040 | A1* | 11/2011 | Chamberlin ............. H02K 1/32 310/59 |
| 2011/0298316 | A1* | 12/2011 | Bradfield ................. H02K 5/20 310/58 |
| 2012/0248920 | A1* | 10/2012 | Takahashi ............. H02K 1/276 310/156.61 |
| 2014/0354090 | A1 | 12/2014 | Chamberlin |
| 2015/0280522 | A1 | 10/2015 | Austin et al. |

FOREIGN PATENT DOCUMENTS

JP        2010081657 A  *  4/2010

OTHER PUBLICATIONS

Machine Translation, Takeuchi, JP 2010081657 A, Apr. 2010.*
(Continued)

*Primary Examiner* — Thomas Truong
(74) *Attorney, Agent, or Firm* — David B. Kelley; Brooks Kushman P.C.

(57) ABSTRACT

A vehicle electric machine may include a stator having end windings extending axially from the stator. A rotor may be disposed within the stator and including an endcap having an outer face defining outlets and a furrowed outer periphery with an edge configured to distribute coolant released from the outlets onto the outer face to different axial locations of the end windings during rotation. The furrowed outer periphery may taper toward an in inner flat portion. The outlets may be contained within the inner flat portion. The furrowed outer periphery may be symmetric about any axis perpendicular to and passing through an axis of rotation of the rotor. The outer face may further define channels extending from the outlets to the edge. The channels may be recessed in the outer face. The furrowed outer periphery may define concentric circumferential ridges.

15 Claims, 5 Drawing Sheets

(56) References Cited

OTHER PUBLICATIONS

"Furrow, n." OED Online. Oxford University Press, Jan. 2018. Web. Feb. 18, 2018.*
"Concentric", OED Online. Oxford University Press, Jun. 2018. Web. Aug. 1, 2018. (Year: 2018).*
"Furrow", OED Online. Oxford University Press, Jun. 2018. Web. Aug. 1, 2018. (Year: 2018).*

* cited by examiner

ELECTRIC MACHINE ROTOR ENDCAP

TECHNICAL FIELD

The present disclosure relates to an endcap of a rotor for an electric machine.

BACKGROUND

Many vehicles rely on electric machines as a source of mechanical energy. Stator windings receive electric current to generate magnetic fields that cooperate with opposing magnetic fields of the rotor to provide torque. Torque created by the electric machine may be limited because of resistive heating of the stator windings, which is caused by the electric current.

SUMMARY

A vehicle electric machine may include a stator having end windings extending axially from the stator. A rotor may be disposed within the stator and including an endcap having an outer face defining outlets and a furrowed outer periphery with an edge configured to distribute coolant released from the outlets onto the outer face to different axial locations of the end windings during rotation. The furrowed outer periphery may taper toward an in inner flat portion. The outlets may be contained within the inner flat portion. The furrowed outer periphery may be symmetric about any axis perpendicular to and passing through an axis of rotation of the rotor. The outer face may further define channels extending from the outlets to the edge. The channels may be recessed in the outer face. The furrowed outer periphery may define concentric circumferential ridges.

A vehicle electric machine may include a stator having end windings extending axially from the stator. A rotor may be disposed within the stator and may include an endcap having an outer face defining outlets and an outer periphery with concentric circumferential ridges configured to distribute coolant released from the outlets onto the outer face to different axial locations of the end windings during rotation. The furrowed outer periphery may taper toward an in inner flat portion. The outlets may be contained within the inner flat portion. The furrowed outer periphery may be symmetric about any axis perpendicular to and passing through an axis of rotation of the rotor. The outer face may further define channels extending from the outlets to the edge. The channels may be recessed in the outer face. The furrowed outer periphery may define concentric circumferential ridges.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric and hybrid vehicles include permanent magnet traction motors to propel the vehicle. Permanent magnets are typically embedded around the rotor of an electric machine rotor. Opposing magnetic fields induced by the stator windings are used to rotate the rotor relative to the stator. The stator has a core formed of electric steel or material having a high relative magnetic permeability. A plurality of slots are distributed along an inner diameter of the stator. Each being sized to receive conductors capable of carrying electric current. Conductors are wound around teeth formed by the slots to form windings. The windings may be arranged to support three distinct electric phases to improve the magnetic field produced. The windings may extend, parallel to the axis of rotation of the rotor, beyond the stator core to allow turns to be made. Turns allow additional windings to be made while maintaining continuity of the circuit. These end turns or end windings collectively form a ring on both outer faces of the electric machine.

Alternating three-phase current may be fed through the stator windings to induce the magnetic fields. Current may cause resistive heating of the stator windings. The stator windings may, as a result, heat the core and surrounding area. Because of thermal limits, resistive heating may unnecessarily limit the mechanical output or cause degradation of the machine. Cooling systems may be used to draw heat away from hot spots, reduce wear on the machine, and improve mechanical energy output.

The rotor may include cooling channels to distribute coolant throughout the rotor. The coolant may exit at each end of the rotor. An endcap disposed at each end may sling coolant to the end windings. The endcap includes outlets or orifices to release the coolant from a plurality of locations. The endcap may be curved or shaped to sling coolant to particular locations on the end windings. The endcap may have a features configured to evenly distribute the coolant to a substantial portion of the end turns extending from the stator core. The endcap may have or define channels to guide the distribution of coolant on the end turns.

The endcap may have a partially convex cross-section to distribute the coolant to a distance that is axially offset from the end turn. The endcap may have an inner planar or flat section. The inner planar section may define the outlets. The outer section of the endcap includes ridges, furrows, swells, waves, or similar features to agitate and alter the direction of coolant flowing from the outlets. The outer section could include one single feature to agitate the oil or multiple features. In a configuration with multiple features, the swells may be organized in a periodic or sporadic fashion. A conglomeration of different features may provide the best distribution of coolant on the end windings. As the endcap spins, the turbulent path created by the features distributes the coolant along the entire, preferably, protrusion of the end turn or end winding from the stator core. The endcap features may undulate in the radial or circumferential direction. Around the outer periphery of the endcap, the peaks and valleys of the features sporadically alter the trajectory of the coolant.

Figure 1:
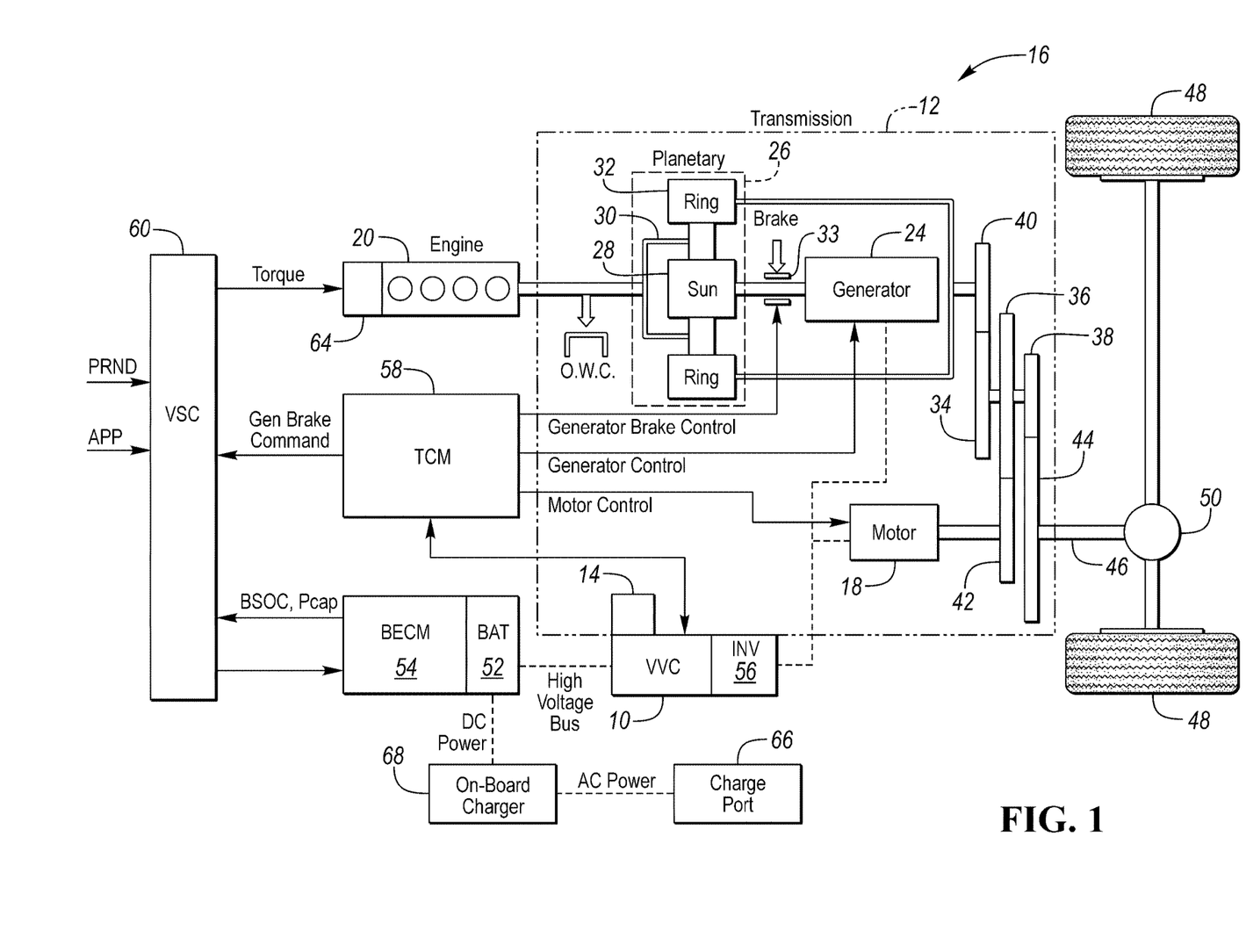
FIG. 1 is a schematic diagram of an example hybrid vehicle.

An example plugin-hybrid-electric vehicle (PHEV) is depicted in FIG. 1 and referred to generally as a vehicle 16. The vehicle 16 includes a transmission 12 and is propelled by at least one electric machine 18 with selective assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the electric machines 18, 24 may be implemented on other types of electric vehicles, such as a hybrid-electric vehicle or a fully electric vehicle.

Figure 2:
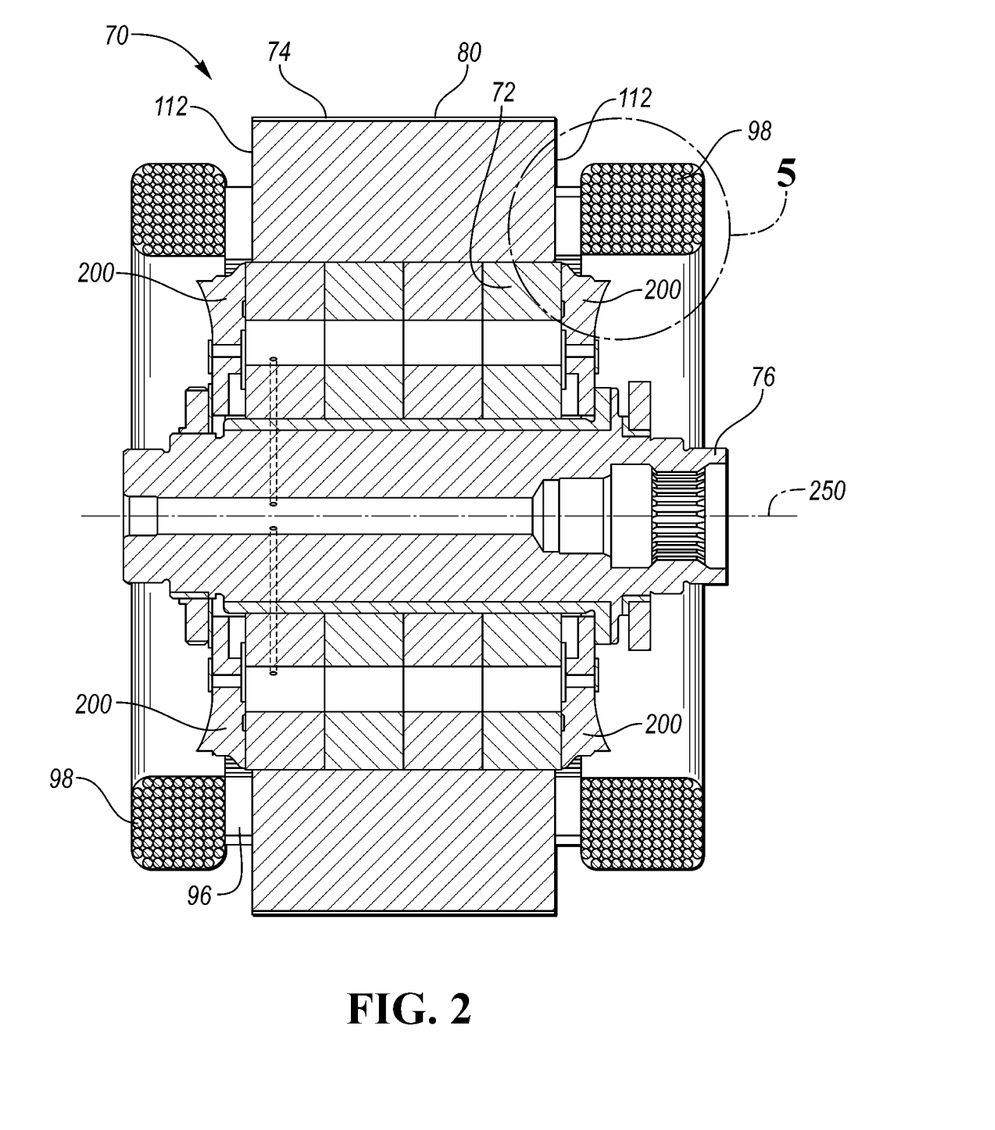
FIG. 2 is side view, in cross section, of a portion of an example electric machine.
Figure 3:
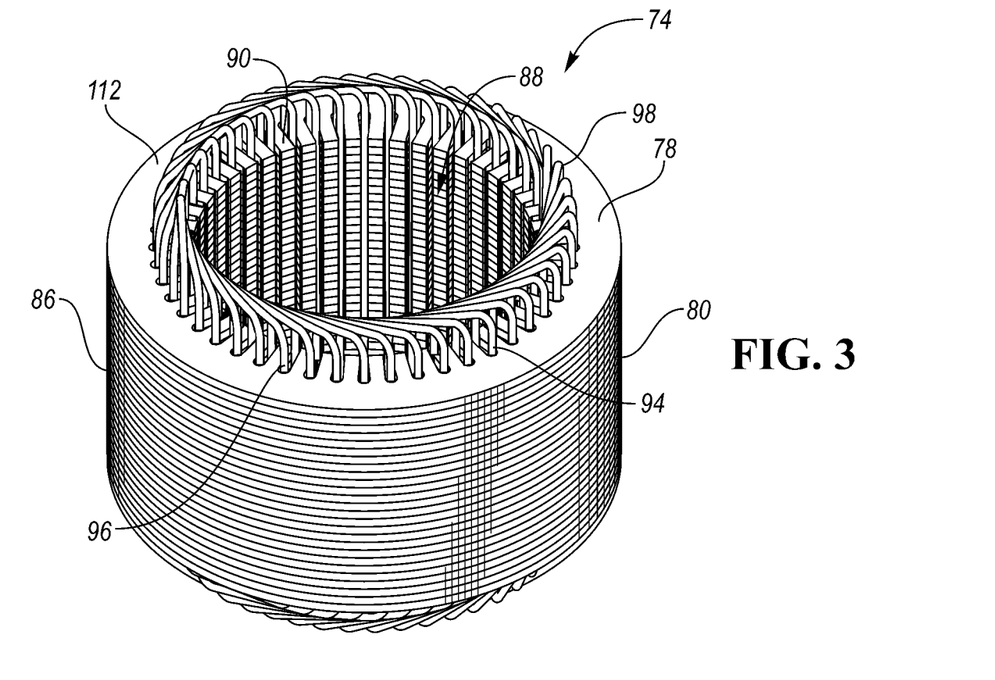
FIG. 3 is an isometric view of a stator of an electric machine.
Figure 4:
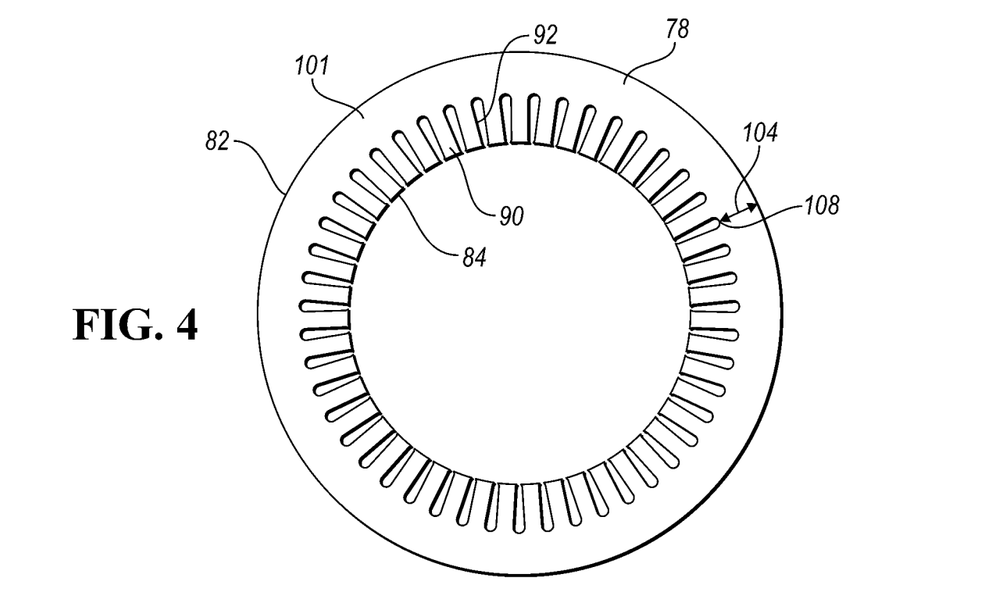
FIG. 4 is a lamination of a stator of an electric machine.

Referring to FIGS. 2, 3, and 4 an example electric machine 70 includes a stator 74 having a plurality of laminations 78. Each of the laminations 78 includes a front side 101 and a back side. When stacked, the front and back sides are disposed against adjacent front and back sides to form a stator core 80. Each of the laminations 78 may be doughnut shaped and may define a hollow center. Each lamination 78 also includes an outer diameter (or outer wall) 82 and an inner diameter (or inner wall) 84. The outer diameters 82 cooperate to define an outer surface 86 of the stator core 80, and the inner diameters 84 cooperate to define a cavity 88.

Each lamination 78 includes a plurality of teeth 90 extending radially inward toward the inner diameter 84. Adjacent teeth 90 cooperate to define slots 92. The teeth 90 and the slots 92 of each lamination 78 are aligned with adjacent laminations to define stator slots 94 extending through the stator core 80 between the opposing end faces 112. A plurality of windings (also known as coils, wires, or conductors) 96 are wrapped around the stator core 80 and are disposed within the stator slots 94. The windings 96 may be disposed in an insulating material (not shown). Portions of the windings 96 generally extend in an axial direction along the stator slots 94. At the end faces 112 of the stator core, the windings bend to extend circumferentially around the end faces 112 of the stator core 80 forming the end windings 98. The end faces 112 define the opposing ends of the core 80 and are formed by the first and last laminations of the stator core 80. While shown as having distributed windings, the windings could also be of the concentrated type.

A rotor 72 is disposed within the cavity 88. The rotor 72 is fixed to a shaft 76 that is operably connected to the gearbox. When current is supplied to the stator 74, a magnetic field is created causing the rotor 72 to spin within the stator 74 generating a torque that is supplied to the gear box via one or more shafts.

During operation, the electric machine 70 generates heat within the stator core 80 and the windings 96. To prevent overheating of the electric machine, a fluid circuit may be provided to remove heat generated during operation. Coolant may enter the electric machine 70 through the drive shaft 76 rotating on axis 250. As the drive shaft 76 rotates, coolant flows through hollow tunnels into the rotor 72. Coolant is then released from the rotor endcaps 200. The endcaps 200 may have a curved or arcuate shape to sling coolant released from the rotor 72 to the end windings or end turns 98 at different axial locations.

Figure 5:
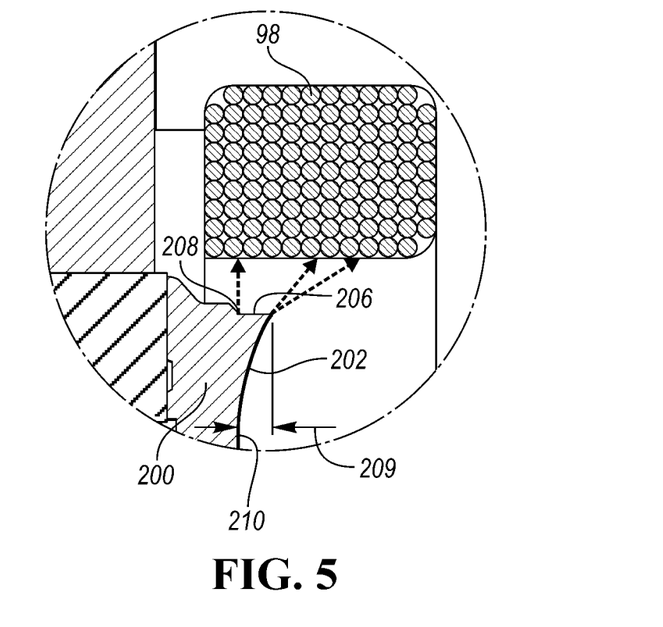
FIG. 5 is a section of the electric machine indicating various landing areas for coolant that has traversed the endcap.
Figure 6:
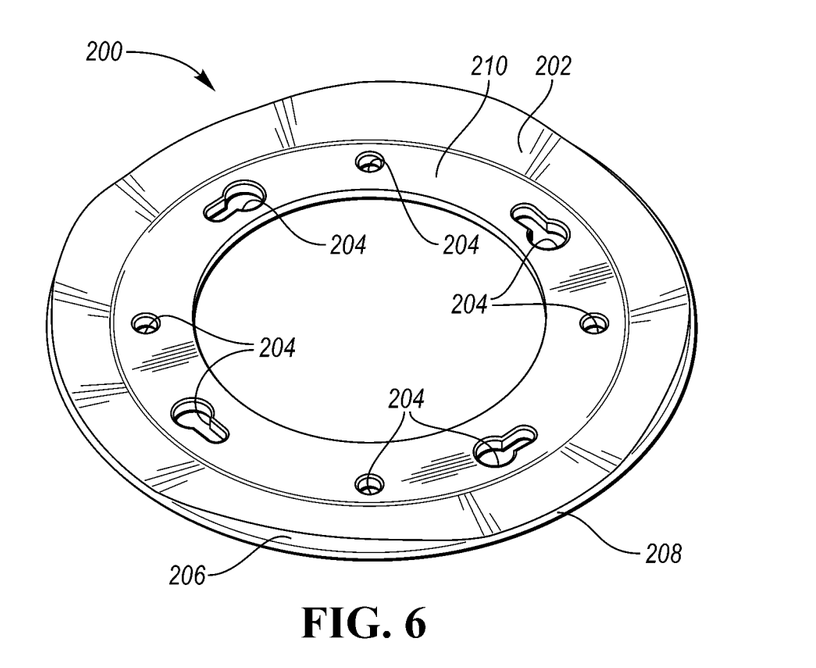
FIG. 6 is an endcap of a rotor.

Now referring to FIGS. 5 and 6, an endcap 200 is shown having a planar inner section 210. The inner section may, in other embodiments, have furrows or undulations. The inner section 210 includes outlets or orifices 204 to release coolant from the rotor body (not shown). The outlets 204 may be different sizes to release various amounts of coolant. The outlets 204 may also be located on the outer section 202 or other locations. Although shown at similar radial differences from the center of the endcap 200, the outlets 204 may be placed at different radial distances from the center of the endcap 200. The outer section 202 may have features that define a furrowed or undulating outer periphery 206. As shown, the features rise and fall along the perimeter of the endcap. The features taper to the inner portion. The outer periphery 206 has an edge 208 that distributes coolant to various locations of the end winding 98. In another embodiment, the features may also taper to the outer edge 208. A swell or crest having tapered edges to both the outer edge 208 and inner section 210 may provide adequate distribution of coolant. The swell or crest height may be related to the length of the windings that extend from the outer face of the stator. For example, the swell or crest height 209, in relation to the flat inner region, may be less than one-half of the extension of the windings beyond the outer face of the stator.

Figure 7:
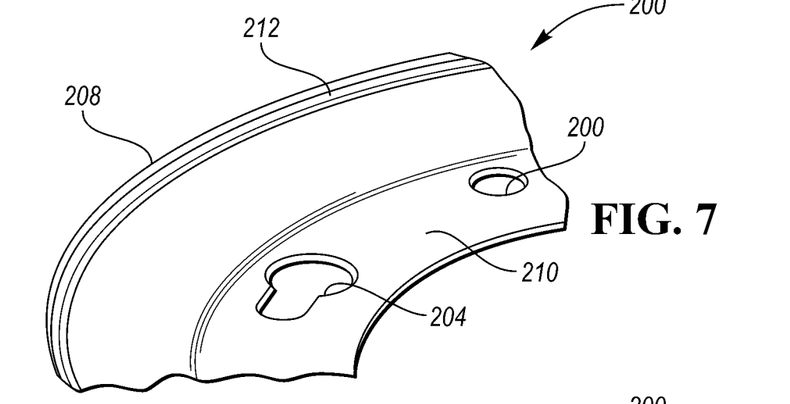
FIG. 7 is another embodiment of an endcap of a rotor.

Now referring to FIG. 7, the endcap 200, in at least one other embodiment, is shown having a planar inner section 210. The inner section 210 includes outlets 204 to release coolant from the rotor body (not shown). The endcap 200 may have a convex cross-section. The endcap may include at least one undulation 212 on the outer periphery extending to an outer edge 208 in the radial direction. Coolant traversing the undulations will have different trajectories and cool different portions of the end windings (not shown).

Figure 8:
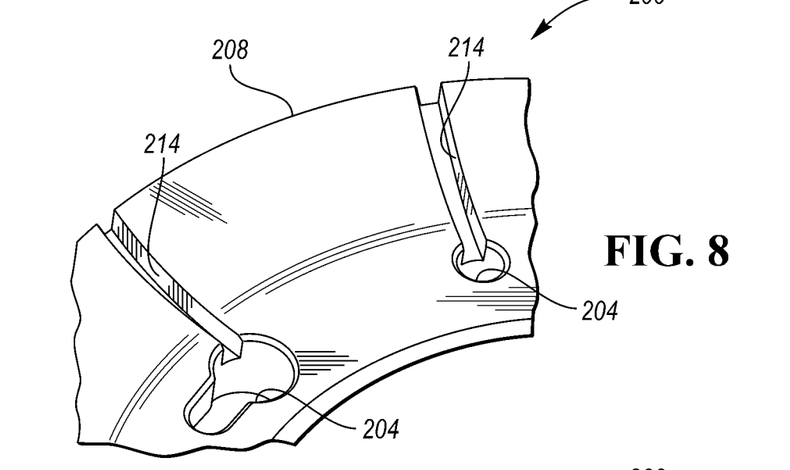
FIG. 8 is another embodiment of an endcap of a rotor having channels.
Figure 9:
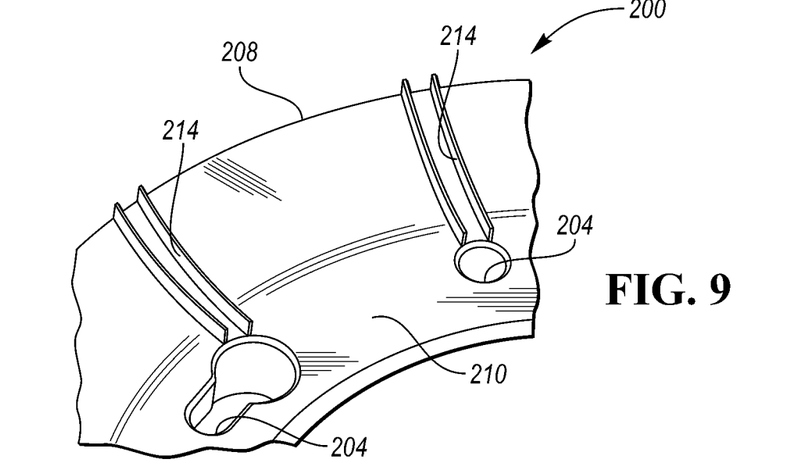
FIG. 9 is another embodiment of an endcap of a rotor having channels.

Now referring to FIGS. 8 and 9, the endcap 200 is shown defining outlets 204. The endcap 200 may define channels 214 to guide coolant released from each of the outlets 204. The channels 214 may have a rectangular or arcuate cross-section. The channels 214 may protrude from the endcap 200 or be defined by the endcap 200 as cavities. The channels 214 may extend to the edge 208 of the endcap 200 or stop short. The channels 214 may be curved like vanes of an impeller to guide coolant to the end windings.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle electric machine comprising:
a stator including end windings extending axially from the stator; and
a rotor disposed within the stator and including an endcap having an outer face (i) bounded by an outermost perimeter corner and an outer periphery and (ii) defining outlets configured to release coolant on the outer face, the outermost perimeter corner being furrowed to distribute the coolant on the outer face to different axial locations of the end windings during rotation.

2. The vehicle electric machine of claim 1, wherein the furrowed outer periphery tapers toward an in inner flat portion.

3. The vehicle electric machine of claim 2, wherein the outlets are contained within the inner flat portion.

4. The vehicle electric machine of claim 3, wherein a maximum difference in height between any two locations on the outer face is less than half of an extended length of the end windings beyond the stator.

5. The vehicle electric machine of claim 1, wherein the furrowed outer periphery is symmetric about any axis perpendicular to and passing through an axis of rotation of the rotor.

6. The vehicle electric machine of claim 1, wherein the outer face further defines channels extending from the outlets to the edge.

7. The vehicle electric machine of claim 6, wherein the channels are recessed in the outer face.

8. The vehicle electric machine of claim 1, wherein the furrowed outer periphery defines concentric circumferential ridges.

9. A vehicle electric machine comprising:
a stator including end windings extending axially from the stator; and
a rotor disposed within the stator and including an endcap having an outer face, defining outlets, bounded by a furrowed outermost perimeter corner and an outer periphery with concentric circumferential ridges configured to distribute coolant released from the outlets onto the outer face to different axial locations of the end windings during rotation.

10. The vehicle electric machine of claim 9, wherein the concentric circumferential ridges taper toward an in inner flat portion.

11. The vehicle electric machine of claim 10, wherein the outlets are contained within the inner flat portion.

12. The vehicle electric machine of claim 11, wherein a maximum difference in height between any two locations on the outer face is less than an extended length of the end windings beyond the stator.

13. The vehicle electric machine of claim 9, wherein the concentric circumferential ridges are symmetric about any axis perpendicular to and passing through an axis of rotation of the rotor.

14. The vehicle electric machine of claim 9, wherein the outer face further defines channels extending from the outlets to an edge of the endcap.

15. The vehicle electric machine of claim 14, wherein the channels are recessed in the outer face.

* * * * *